United States Patent Office 3,313,109
Patented Apr. 11, 1967

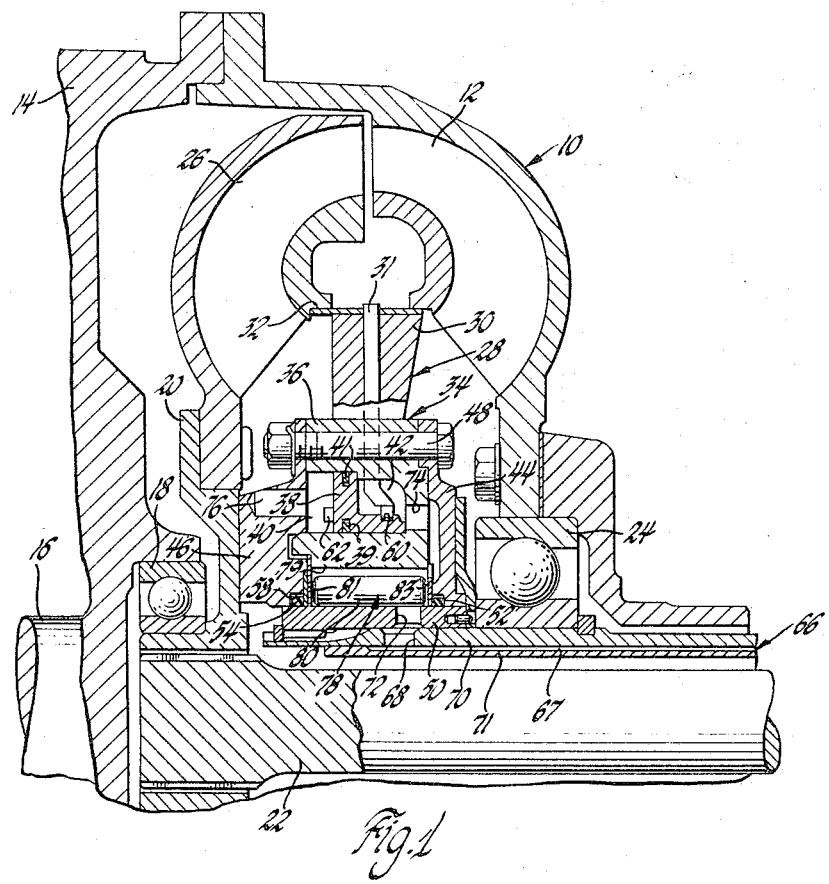

3,313,109
HYDRODYNAMIC TORQUE CONVERTER
Robert M. Tuck, Indianapolis, Ind., assignor to General Motors Corporation, Detroit, Mich., a corporation of Delaware
Filed Mar. 7, 1966, Ser. No. 532,351
13 Claims. (Cl. 60—54)

This invention relates to hydrodynamic torque converters and particularly to improved torque converter rotor construction.

This application is a continuation-in-part of U.S. patent application 472,483, filed July 16, 1965.

Torque converters have been constructed with rotors having blades whose pitch is varied by a hydraulic motor or other suitable pitch control mechanism to vary converter capacity. Generally, the converter stator blades are varied in pitch for this change in converter capacity; however similar results may be obtained by varying the pitch of the blades of the converter pump or turbine. In addition to housing a blade pitch control mechanism, the stator is often mounted on a one-way brake. In one phase of operation, this brake holds the stator from rotating in one direction so that the converter can multiply input torque. In another phase of operation, the brake allows the stator to freewheel in an opposite direction so that the converter can function as an efficient fluid coupling and transmit torque without torque multiplication.

The torque converter of the present invention includes advanced rotor construction, illustrated and described as a stator, in which variable pitch stator blades, a hydraulically actuated pitch control motor, and a one-way brake are concentric and are all in radial alignment. This provides for a balanced, compact stator construction and allows the utilization of longer rollers in the one-way device. Since the rollers are long, their load capacity is high and spread across the entire length of the roller providing greater durability as compared to shorter rollers used with prior art devices. Furthermore, in this invention, stator blade motor operation is improved inasmuch as improved sealing is provided between the end plates of the stator hub and the stator race.

An object of this invention is to provide a torque converter having improved rotor construction.

Another object of this invention is to provide a hydrodynamic torque converter having a rotor with variable pitch blades, a motor mechanism for varying the pitch of the rotor blades, and a one-way device which allows the rotor to rotate in one direction, but holds the rotor from rotating in an opposite direction; the rotor, motor and one-way device being in general radial alignment.

Another object of this invention is to provide an advanced rotor construction in a torque converter including one-way braking means having elongated rolling devices which are centrally located with respect to the stator hub and which provide increased bearing surfaces.

Another object of this invention is to provide a torque converter having improved stator construction with variable pitch blading, including a hydraulic motor mechanism and further including improved sealing for containing operating fluid used to actuate the motor mechanism.

Other objects, advantages, and benefits of this invention will become apparent from the following detailed description and drawings in which:

FIGURE 1 is a sectional view of a portion of a hydrodynamic torque converter; and FIGURE 2 is an enlarged portion of FIGURE 1.

As shown in FIGURE 1, there is a hydrodynamic torque converter 10 including a bladed pump 12 driven through rotatable housing 14 by an input shaft 16. The housing has a front wall formed with an annular shoulder for bearing 18 which rotatably supports annular turbine connector plate 20 and the front end of output shaft 22 splined thereto. Bearings 24 rotatably support the converter pump which pumps operating fluid in the converter that turns the bladed turbine 26, plate 20, and connected output shaft 22.

The torque converter includes a stator 28 which has a plurality of variable pitch vanes or blades 30 located between the turbine and the pump. These blades are securely mounted on crank arms 31 between an outer annular shroud 32 and a hub assembly 34 of the stator. The hub assembly includes a main body 36, preferably of two parts, to facilitate insertion of cranks 31. The body is formed with an interior cylindrical chamber that receives an annular motor or piston 38 that separates the chamber into pressure chambers 40 and 42. The hub assembly further includes annular end plates 44 and 46 that are connected to the main body portion 36 by bolts 48. These end plates have inner annular bearing surfaces which are seated on an annular race 50. As shown, annular fluid seals 52 and 54 of suitable elastomeric materials; such as fluorocarbon plastic, fluorocarbon elastomer, etc., are positioned on the race 50 and are located within annular recesses 56 and 58 formed in the inner surfaces of the end plates 44 and 46. These seals seal the hub assembly and the race by abutment fit in the end plates 44 and 46, and close circumferential fit around the race for a purpose which will be later described.

The piston or motor 38 is movably mounted within the chamber formed by the hub assembly and has inner and outer annular seals 39 and 41 of suitable elastomeric material which contacts annular shoulders provided by the main body portion of the hub assembly to seal chambers 40 and 42. The piston has a circular groove 60 which receives the inner end of the crank arms 31 so that movement of the piston within its chamber will turn the crank arms and the connected stator blades. Each crank arm has a straight portion which extends through a suitable opening in the hub assembly and has its outer end received in the stator shroud 32. The outer face of the piston is provided with an annular projecting stop 62 that provides a stop to abut end plate 46 to limit the movement of the piston in one direction in the stator hub assembly 34.

The motor position, and therefore blade setting, is controlled by the opposing forces of fluid pressure within the chambers 40 and 42, effective on the opposite faces of piston 38. A passage 66 is provided for conducting control fluid to and from chamber 42. This passage includes: passage 67 between ground sleeve 70 and shouldered sealing sleeve 71; opening 68 formed in ground sleeve 70; opening 72 in race 50; the passage between plate 44, body 36, and opening 74 leading directly into chamber 42. Operating fluid into and out of chamber 42 is controlled by a valve, such as valve 38 of the parent application Ser. No. 472,483. Seals 52 and 54 are effective to prevent leakage of fluid between the hub assembly and the race 50. A passage 76 connects the chamber 40 and the other side of the motor 38 to converter pressure.

The hub assembly is mounted on a suitable one-way brake 78, which includes elongated rollers 80 mounted on the inner race 50. The race 50 is splined to the ground sleeve 70 as illustrated. Each of the rollers is positioned between the inner race 50 and an outer race provided by body portion 36 having sloping cam openings or surfaces 79 such as illustrated and described in United States Patent No. 2,734,399 to H. W. Christenson and United States Patent No. 3,031,052 to W. Blinder. The rollers are movable to permit stator rotation in one direction. But, when the stator attempts to rotate in a reverse direction, the rollers will be wedged into the small end of the cam opening to lock the main body portion to the race 50. The rollers are elongated and extend in their cam openings across a major portion of the hub of the body portion 36 as shown in FIGURE 1 and provide high load capacity by virtue of their elongated bearing surfaces. The rollers are held in position by cage structures 81 and 83.

When the blades are in a low angle position, with respect to the converter centerline, converter absorption capacity is high; and most of the torque developed by the input power plant will be absorbed by the converter. As the stator blades are turned to their high angle position, the converter torque absorption capacity is reduced in accordance with blade position.

The stator blades are normally retained in the low angle, high converter capacity position by converter outlet pressure on the face of piston 38, forcing the piston to the FIGURE 1 position. Converter outlet pressure is connected to chamber 40 through the openings 76 in the plate 46. Chamber 42 is exhausted at this time by a valve such as valve 38 that is illustrated in the identified parent application.

The piston can be moved to the left in FIGURE 1 by pressurizing the apply chamber 42 with a regulated pressure from the identified control valve through the passage and the openings leading into chamber 42 sufficient to overcome the force of opposing pressure within chamber 40. When the piston is moved to the extreme left position, stop 62 contacts the end of the plate 46 and the crank arms will be turned to move the stator blades to their highest angle, lowest capacity position.

From the above, it will be seen that applicant has provided improved torque converter construction in which the stator, the motor, and the one-way clutch are concentric and are all radially aligned to provide a balanced, compact rotor assembly, and in which the use of elongated rollers is possible to provide increased load capacity.

Furthermore, it will be seen that applicant has provided improved sealing for improved motor control. If the seals were located in the stator race, slight variations in the dimensions of the stator hub assembly could possibly be such that the inner core of the end plates would not be aligned with the seals; sealing would not be effective; and thus motor operation would be hampered. The seal of this invention being positioned by the hub assembly insures sealing, therefore improving the performance of mass produced converters.

Having described one embodiment of this invention, it will be understood that other embodiments may be made utilizing applicant's teaching and that applicant is not to be restricted by the description of this illustrated embodiment, but only by the claims which appear hereafter.

I claim:

1. In a hydrodynamic unit, a vaned rotor, a support, said rotor being rotatably mounted on said support, one-way coupling means for mechanically coupling said rotor and said support to retard rotation of said rotor in one direction and for permitting said rotor to rotate relative to said support in an opposite direction, motor means for varying the pitch of the vanes of said rotor, said motor means and said one-way coupling means being concentric and radially aligned with each other and said vaned rotor.

2. The unit in claim 1, said rotor including a hub rotatably mounting said rotor on said support, said motor means including a piston, said piston being movably mounted in said hub to turn the vanes of said rotor to different angular settings, a passage for conducting motor operating fluid to and from one side of said piston, sealing means supported on the outer surface of said support for hydraulically sealing said support and said hub to allow motor operating fluid to be fully effective on one side of said piston.

3. The unit in claim 2, wherein said one-way coupling means is a one-way brake, said brake including roller means which extend across a major portion of said hub to provide high load capacity when said rollers operate to couple said rotor and said support.

4. The unit of claim 1 wherein said one-way coupling means is a one-way brake, said one-way brake including cylindrical rollers, each of said rollers extending across a major portion of the hub of said rotor to provide high load capacity when said rollers operate to couple said rotor and said support.

5. In a hydrodynamic torque converter including a plurality of rotors, a converter input and an output, one of said rotors having variable pitch vanes, said one rotor having a hub portion, support means mounting said one rotor for rotation with respect thereto, motor means mounted within said hub portion for turning said vanes to varying angles with respect to the centerline of said converter for varying the capacity of said converter, a one-way friction device located radially inwardly of said motor means for limiting rotation of said one rotor in one direction on said support means and allowing rotation in an opposite direction, said one-way friction device including a plurality of elongated one-way drive members extending axially across a major part of said hub portion, said rotor and said motor means and said one-way friction device being concentric and radially aligned with each other.

6. The torque converter of claim 5, said hub portion having an annular chamber therein, said motor means being an annular movable piston mounted in said chamber, fluid passage means leading to said chamber and one side of said piston to conduct operating fluid to and away from said piston, and sealing means external of said support for maintaining said passage to said chamber.

7. The converter of claim 6, wherein said seals are spaced annular rings mounted externally on said support, said seals sealing by circumferential fit on said support and abutment fit with said hub.

8. The converter of claim 6, wherein said one-way friction device is a one-way brake having a plurality of rollers, said rollers extending substantially between the seals to provide a high load capacity when coupling said rotor to said support.

9. The converter of claim 8, in which said rotor is a stator, said hub including end plates, said end plates being formed with annular bearing surfaces having inwardly facing recesses to receive said seals.

10. The converter of claim 9 wherein passage means is provided in said hub to admit converter pressure to the other side of said motor, said motor being biased toward one end of said chamber to turn the blades of said stator to a high capacity position.

11. The converter of claim 9 wherein said support is an annular grounded sleeve, said rollers of said one-way brake being disposed around said sleeve, said hub including cam portions for camming said rollers into contact with said sleeve, said piston being concentric with said sleeve and with said one-way brake.

12. In a torque converter having a plurality of rotors including a bladed stator, an annular bearing sleeve, said stator including a hub assembly, said hub assembly including spaced end plates supporting said stator on said sleeve for rotation thereon, spaced sealing rings circumferentially fitted on said sleeve, each of said sealing rings being in abutment fit with a respective end plate to seal said hub assembly and said bearing sleeve, a piston movably mounted in said hub assembly for varying the pitch of the blades of said stator, a fluid control passage for conducting operating fluid to and from one side of said piston, said passage including the space between said seals, a second passage connecting the other side of said motor to converter pressure.

13. The converter of claim 12, and further including means between said hub assembly and said bearing sleeve to couple said stator to said sleeve subsequent to limited rotation of said stator in one direction and to permit rotation of said stator relative to said sleeve in an opposite direction, said piston being concentric with said last mentioned means.

References Cited by the Examiner

UNITED STATES PATENTS

| | | | |
|---|---|---|---|
| 2,882,684 | 4/1959 | Kelley | 60—54 |
| 3,025,719 | 3/1962 | Kelley et al. | 60—54 X |
| 3,063,742 | 11/1962 | Howard | 60—54 X |
| 3,096,613 | 7/1963 | Winchell et al. | 60—54 X |

EDGAR W. GEOGHEGAN, *Primary Examiner.*